(12) United States Patent
Edwards et al.

(10) Patent No.: US 6,318,353 B1
(45) Date of Patent: Nov. 20, 2001

(54) CONCRETE SAW WITH MULTISPEED DRIVE

(75) Inventors: Brian S. Edwards, Amherst; Charles Markley, Avon Lake, both of OH (US)

(73) Assignee: Diamond Products, Limited, Elyria, OH (US)

( * ) Notice: Subject to any disclaimer, the term of this patent is extended or adjusted under 35 U.S.C. 154(b) by 0 days.

(21) Appl. No.: 09/507,587

(22) Filed: Feb. 21, 2000

(51) Int. Cl.$^7$ ........................................ B28D 1/04
(52) U.S. Cl. .......................................... 125/13.01; 125/14
(58) Field of Search ........................ 125/12, 13.01, 125/14

(56) References Cited

U.S. PATENT DOCUMENTS

| | | | |
|---|---|---|---|
| 2,700,256 | * | 1/1955 | Lewis ..................................... 125/14 |
| 2,783,789 | * | 3/1957 | Konway ................................. 125/14 |
| 4,077,731 | * | 3/1978 | Holz, Sr. et al. ...................... 404/83 |
| 4,375,212 | * | 3/1983 | Santschi ................................. 125/14 |
| 4,456,303 | * | 6/1984 | Due ........................................ 299/10 |
| 5,381,780 | * | 1/1995 | Yelton et al. .......................... 125/14 |
| 5,452,943 | * | 9/1995 | Campbell ............................... 299/39 |
| 5,579,753 | * | 12/1996 | Chiuminatta et al. ................ 125/12 |
| 5,809,985 | | 9/1998 | Kingsley et al. ................. 125/13.01 |
| 5,950,612 | * | 9/1999 | Zuzelo et al. ..................... 125/13.01 |
| 6,102,022 | * | 8/2000 | Schave .............................. 125/13.01 |
| 6,131,557 | * | 10/2000 | Watson .............................. 125/13.01 |

* cited by examiner

*Primary Examiner*—Eileen P. Morgan
*Assistant Examiner*—Hadi Shakeri
(74) *Attorney, Agent, or Firm*—Rankin, Hill, Porter & Clark LLP

(57) ABSTRACT

A concrete saw for cutting concrete and other hard surfaces or substrates. The concrete saw includes a multispeed drive for transmitting power from the saw's engine to the saw's cutting blade. The multispeed drive includes a flexible belt for transmitting rotational energy from the drive shaft of the engine to the drive shaft for the blade, and a releasable tension device for placing tension on the belt and ensuring good engagement between the sprockets of the drive shafts. Upon release of the tension device, a user may move the belt to an alternate position on the sprockets and retension the belt, thereby providing a different drive ration and speed for the cutting blade at a constant engine speed.

17 Claims, 6 Drawing Sheets

CONCRETE SAW WITH MULTISPEED DRIVE

FIELD OF THE INVENTION

The present invention is related to an internal combustion powered saw for cutting concrete, stone, asphalt and other similar surfaces, and in particular, to a concrete saw equipped with a multispeed drive system.

BACKGROUND OF THE INVENTION

In the concrete industry, when building bridges, buildings, roads and the like, it is often necessary to pour large horizontal slabs of concrete. Once poured, it is usually necessary to machine the slab. Such machining may include cutting seams completely through the slab (to form expansion joints and to allow for foundation shifting), cutting notches partially into the slab (to create stress cracks along which the slab will split), cutting multiple grooves into the slab to create a high friction surface such as for bridges, grinding the surface of the slab and the like. Various types of concrete saws may be utilized to carry out these machining tasks. In larger industrial applications, large self-propelled saws are used which are powered in a variety of manners, such as by gasoline, diesel, electric, propane and natural gas engines mounted on the saw. While performing a cut, the operator walks behind the saw to control the direction, cutting speed, cutting depth and the like.

Typical self-propelled concrete saws are mounted upon rear drive wheels and upon a hinged front axle assembly which raises and lowers the front end of the saw. The front axle assembly includes a height adjustment cylinder that is attached to a front axle assembly having the front wheels thereon. The front axle assembly pivots downward away from, and upward toward, the saw frame when the cylinder extends and retracts thereby raising and lowering the saw. The saw blade is mounted upon a blade support shaft proximate the front of the saw and thus as the front end is raised and lowered, the cut depth is varied.

Conventional concrete saws include a gasoline, diesel, propane (internal combustion), hydraulic and air or electric engine aligned along an axis transverse to the longitudinal axis of the saw frame. This transverse arrangement aligns the engine crankshaft parallel to the rotational axis of the saw blade, to afford an easy design for interconnecting pulleys upon the crankshaft and the saw blade.

Conventional internal combustion (nonelectric) powered concrete saws utilize a mechanical governor for controlling the RPMS (revolutions per minute) of the engine and the saw blade. Every type of saw blade operates at a different optimal rotational speed. The optimal speed for a given blade is maintained by using a specific pulley size to blade size ratio. This requires changing the pulleys in the drive system to accommodate specific blade sizes. If optimal speed is not maintained, engine power is lost and blades can be damaged. Most nonelectric powered concrete saws are designed to operate with a plurality of blade sizes and they are capable of rotating at extremely high speeds.

Most prior art internal combustion saws only operate at one cutting blade speed. Because different saw blades operate at peak performance at different rotational speeds, saw performance is limited due to a single speed drive system. Thus, there is a need to vary blade speed based on the particular blade being used or the sawing conditions encountered. The prior art provides multispeed drive systems for concrete saws. However, such saws rely on complex, costly and/or limited service life transmissions or hydraulic drive systems. Some hydraulic systems require water cooling that prevents use of the saw for dry cutting operations. Also, in some prior art multispeed machines, the pulleys are so large that they interfere with a saws ability to make a cut of acceptable depth. Thus, the need exists for an internal combustion powered concrete saw capable of operating at different rotational cutting speeds having a dependable and simple multispeed drive system.

SUMMARY OF THE INVENTION

The present invention provides a new and improved saw for cutting concrete, asphalt, stone and other hard or tough surfaces. The saw of the present invention includes a multispeed drive that allows an operator or user to easily vary the speed of the cutting blade, thereby helping to facilitate optimum cutting speeds and performance.

In a preferred embodiment, the saw of the present invention includes a multispeed drive for transmitting power from the engine to the cutting blade. The multispeed drive includes a flexible belt for transmitting rotational energy from the drive shaft of the engine to the drive shaft for the blade, a releasable tension device for placing tension on the belt and ensuring good engagement between the sprockets of the drive shafts. Upon release of the tension device, a user may move the belt to an alternate position on the sprockets, and retension the belt, thereby providing a different drive ratio and speed for the cutting blade and at a constant or set engine speed. The belt preferably includes a series of teeth along its inner diameter or surface.

The foregoing and other features of the invention are hereinafter more fully described and particularly pointed out in the claims, the following descriptions setting forth in detail certain illustrative embodiments of the invention, these being indicative, however, of but a few of the various ways in which the principals of the present invention may be employed.

DETAILED DESCRIPTION

Figure 1:
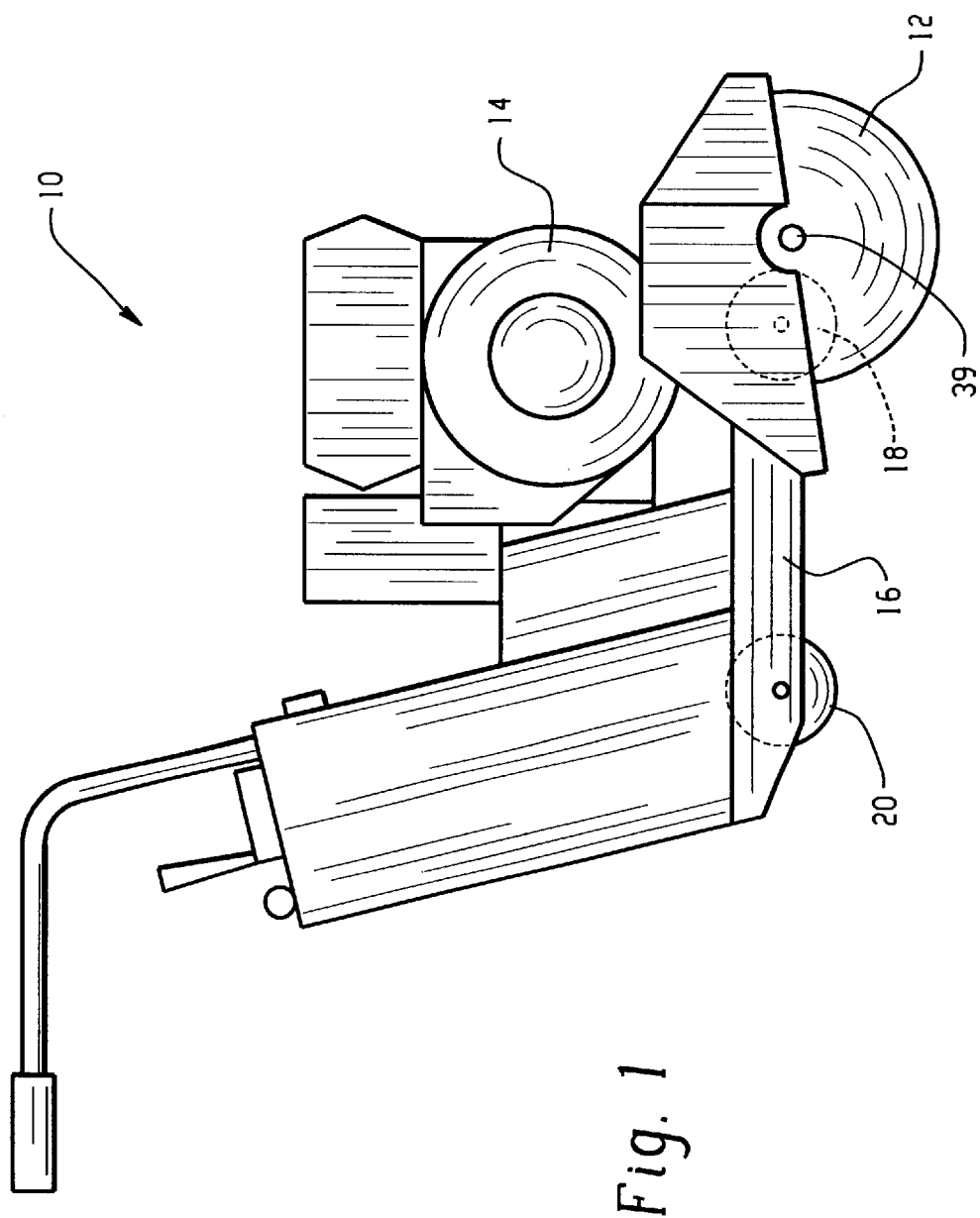
FIG. 1 is a side view of a saw made in accordance with the present invention.
Figure 2:
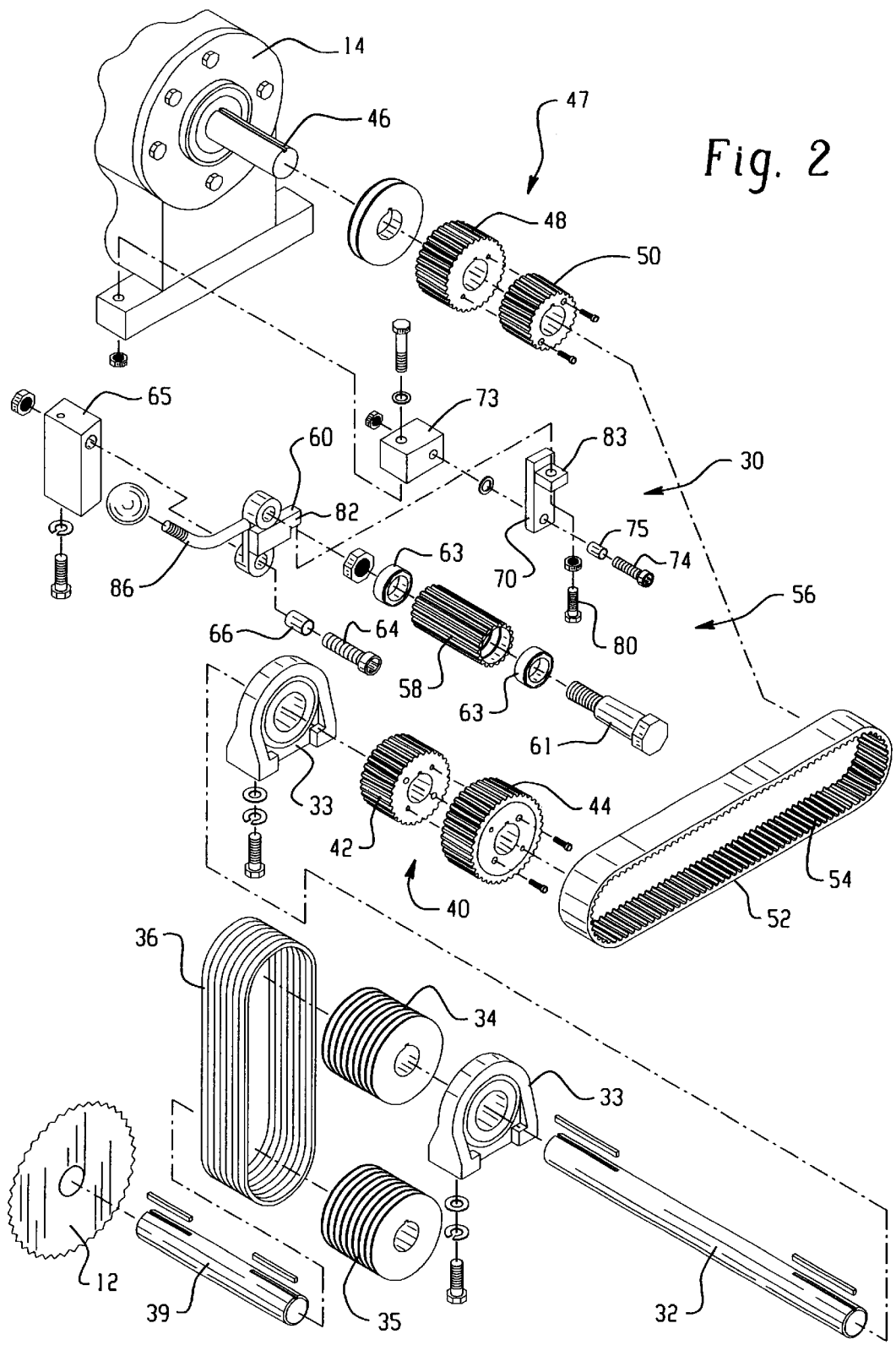
FIG. 2 is a perspective exploded view of the multispeed drive system of the saw shown in FIG. 1.

Referring to the drawings, and initially to FIG. 1 there is shown a saw 10 for cutting concrete, asphalt, stone and other hardened surfaces made in accordance with the present invention. Saw 10 includes a blade 12, an engine 14, a frame 16 and a set of front 18 and rear 20 wheels. Saw 10 is preferably a self-propelled saw, and thus the rear wheels 20 are driven in a conventional manner (e.g., a hydraulic drive system). However, it will be appreciated that saw 10 could be a push-type saw.

Referring now additionally to FIGS. 2–5, the details of the multispeed drive system 30 are more clearly illustrated. System 30 includes a drive or jack shaft 32 supported at each end by bearings 33 for transmitting power across the front of the saw 10 and to the blade 12. Shaft 32 includes at one end a multi-sheave pulley 34 for driving V-belts 36 and multi-sheave pulley 35. Pulley 35 is connected by shaft 39 to blade 12. Located at the fore end of shaft 32 is a sprocket assembly 40 comprising a pair of sprockets 42 and 44. Sprockets 42 and 44 are of different diameters.

Provided on the output shaft 46 of engine 14 is a sprocket assembly 47 comprising a pair of sprockets 48 and 50. Sprockets 48 and 50 are of different diameters. Extending between the sprocket assemblies 40 and 47 is a flexible belt 52. Belt 52 includes a plurality of teeth extending along the inside surface or diameter 54 of belt 52. The teeth of belt 52 engage the teeth formed along the outer diameter of the sprockets 42, 44, 48 and 50.

Located between sprocket assemblies 40 and 47 is a releasable tensioning unit or assembly 56. Tension assembly 56 includes an idler sprocket 58 which is supported for rotation upon idler arm 60 by axle screw 61 and bearings 63. Idler arm 60 is supported upon idler block 65 that is mounted to the frame 16 of the saw 10. Idler arm 60 is supported for pivotal rotation on idler block 65 by capscrew 64 and bearing 66. Assembly 56 also includes tension arm 70 that is pivotally mounted to tensioner mount block 73 by screw 74 and bearing 75. Mount block 73 is also mounted to the frame 16 of the saw 10. Tension arm 70 includes a tensioning screw 80 that may be adjusted (threaded) up and down relative to platform 83. As the end of screw 80 engages tab 82 of idler arm 60, sprocket 58 is pushed harder against the inner surface 54 of belt 52, thus putting greater tension on the belt 52.

Figure 3:
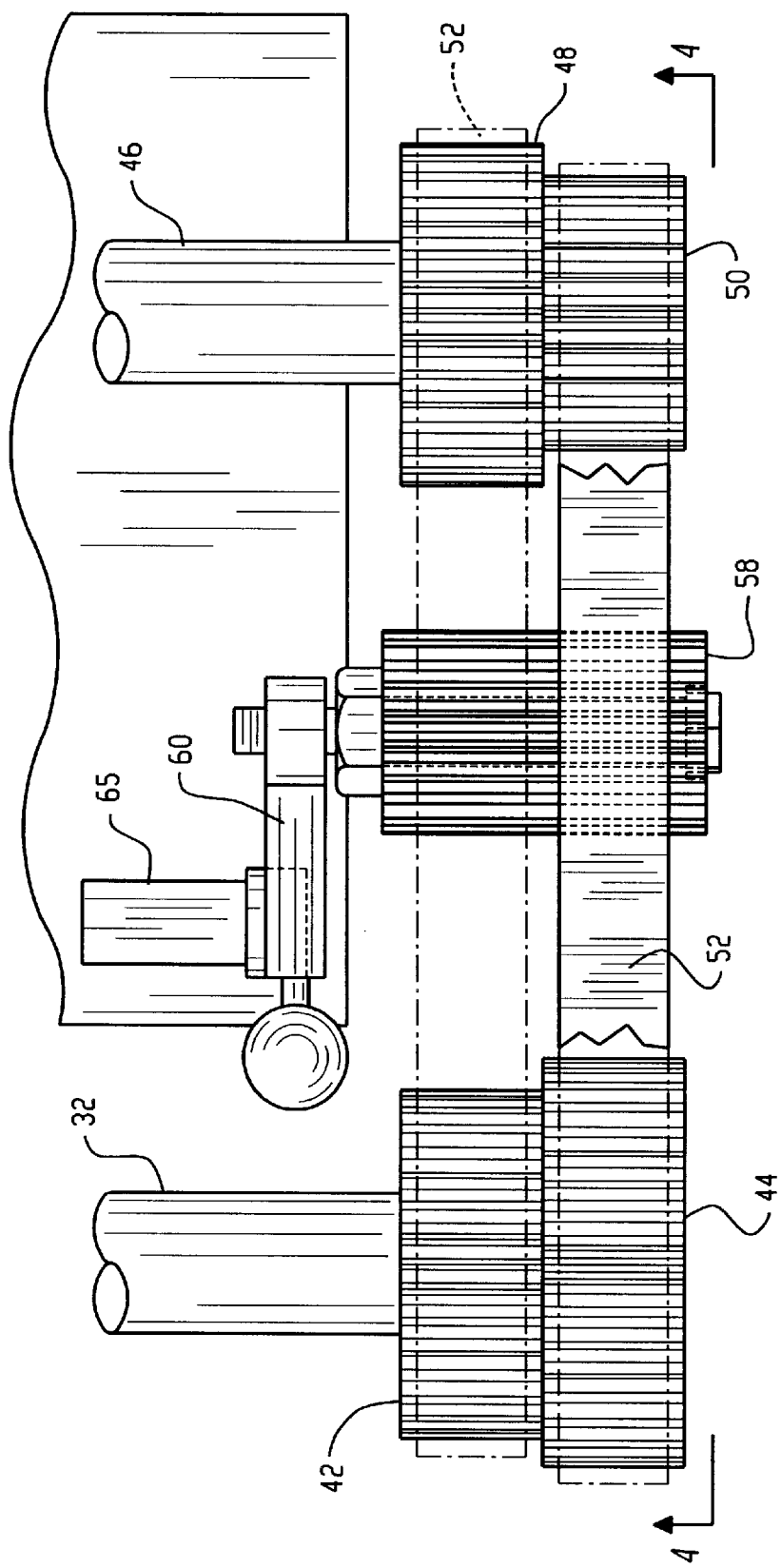
FIG. 3 is a top view of a portion of the multispeed drive system of FIG. 2.
Figure 4:
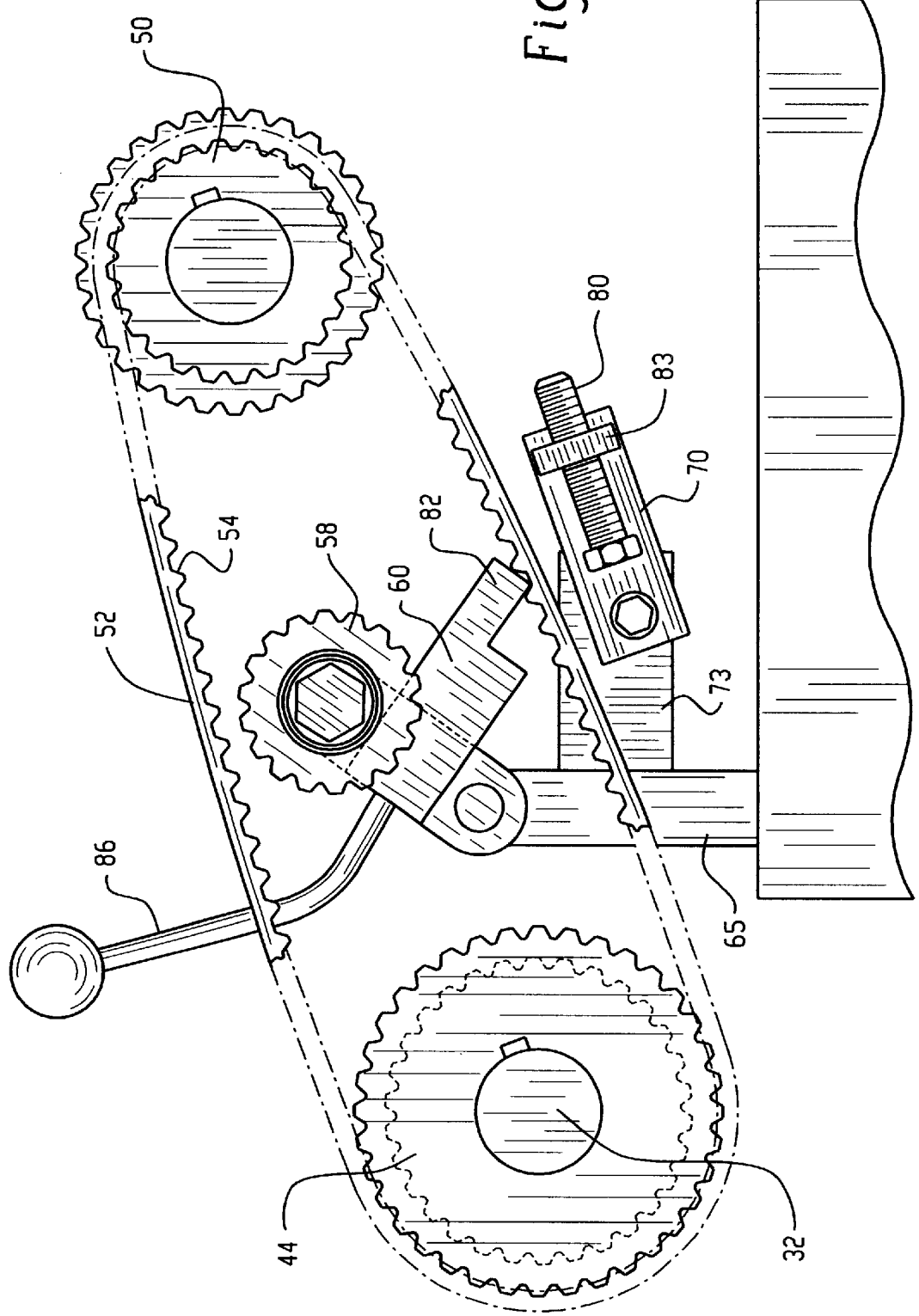
FIG. 4 is a side view of the portion of the multispeed drive system shown in FIG. 3.
Figure 5:
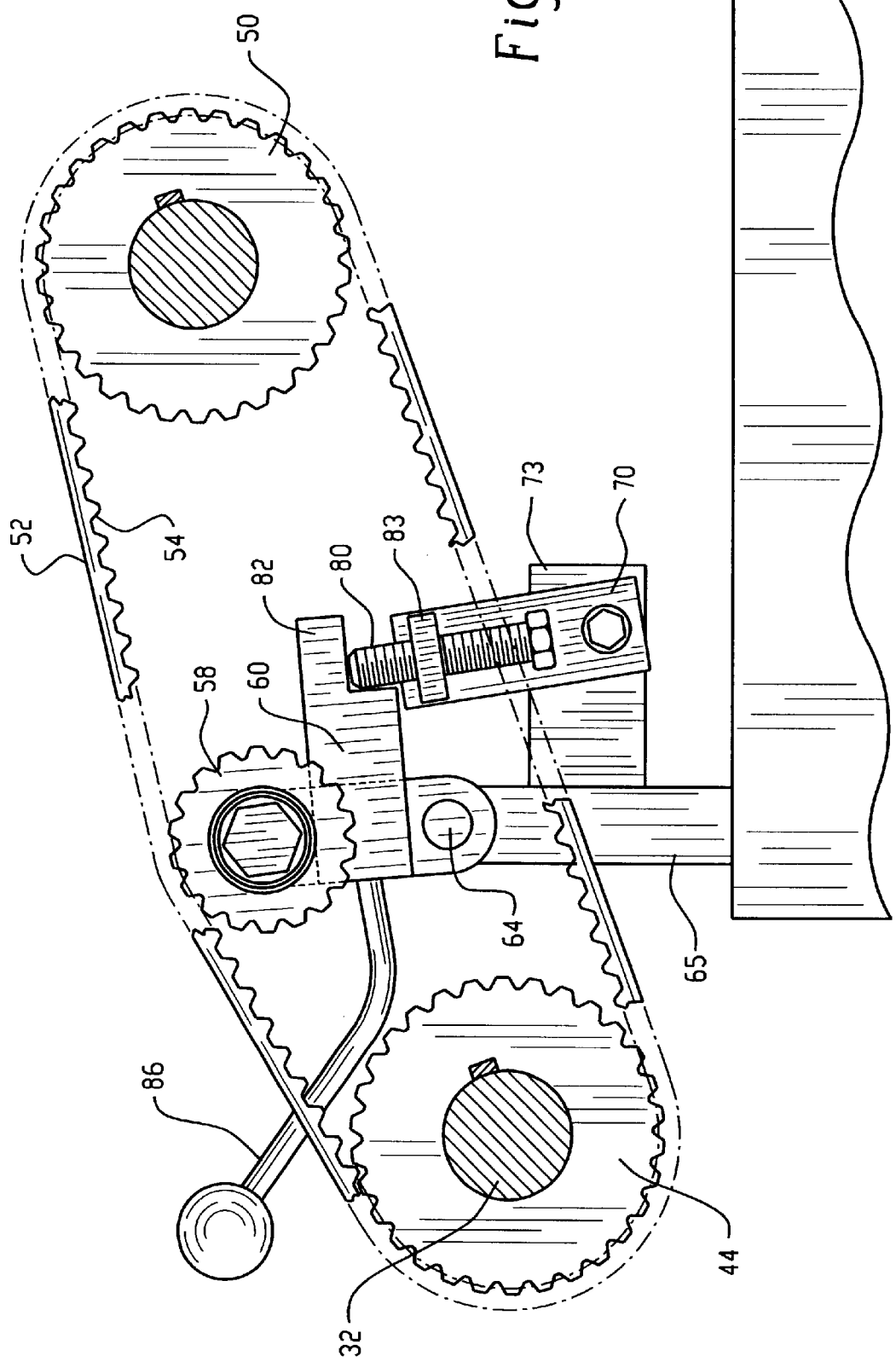
FIG. 5 is another side view of the portion of the multispeed drive system shown in FIG. 3 in the engaged position.

Idler arm 60 includes a handle 86. Handle 86 allows a user to pull on idler arm 60 and place greater tension on belt 52. While pulling on handle 86, tension is released as between the end of screw 80 and tab 82 and thus a user can flip the tension arm 70 back and out of engagement with tab 82. This allows idler arm 60 to swing down out of engagement with belt 52 and into the position shown in FIG. 4, relieving all tension on belt 52. In the untensioned mode, belt 52 can move freely and easily along sprocket assemblies 40 and 47, allowing the user to select the specific diameter of sprocket desired as best seen in FIG. 3, thereby altering the drive rate for the cutting blade 12. A user can then retension the belt 52 by pulling on handle 86 and flipping tension arm 70 up such that the end of screw 80 engages tab 82. Screw 80 can then be adjusted to produce the desired tension. Of course, it will be appreciated that sprocket assemblies 40 and 47 may comprise more than the illustrated two sprockets of differing diameter. Depending upon the bearing load limits of engine 14 and space constraints, three or more sprockets of differing diameter could be utilized. Of course, it will also be appreciated that sprocket assemblies 40 and 47 could be formed of a single piece.

Belt 52 may comprise any number of conventionally available toothed flexible rubber belts. However, a preferred belt is a POLYCHAIN® synchronous belt available from the Gates Rubber Company. Such synchronous belts resist slipping and they normally do not require continual retensioning. This type of belt does an excellent job of transferring energy. One synchronous belt can do the job of many V-belts thereby saving valuable space. The use of a synchronous belt affords several advantages over conventional V-belts. For example, synchronous belts operate at zero slip and they do not require near the load that V-belts require for proper tensioning. Lower tension levels reduce load levels on shafts, thereby helping to extend bearing life. Engine crankshafts are especially sensitive to high tension loads. High belt tension loads create a bending effect upon the crankshaft which reduces engine life. Generally, engines are designed with light shell type bearing to support the crankshaft. These shell type bearings are not capable of withstanding major side loads over a substantial period of time. The use of a synchronous belt, that requires minimal tensioning, avoids all of the excessive loading issues presented by V-belts.

The ability to quickly and easily alter the cutting speed of the blade provides a distinct advantage. Specifically, it allows a user to quickly match the cutting speed to the particular blade being used and/or specific sawing conditions. Depending upon the condition of the surface being cut, a slower or faster cutting speed at a particular engine rpm can be desired.

The particular configuration of the present drive system 30 provides several distinct advantages. First, the configuration provides for engagement along the inner surface 54 of belt 52, thereby saving room and thus minimizing the size of the drive system 30. Also, in the present design the V-belts 36 are at the end of jack shaft 32 thereby facilitating the replacement of such belts. The configuration also allows one to use small pulleys to drive the V-belts 36, thereby facilitating good cutting depths. Use of the jack shaft 32 that extends across the width of the saw 10, along with V-belts 36 and toothed belt 52 also provides an advantage. Specifically, such arrangement minimizes the width of the saw, reduces loads on the engine bearings, and because it employs V-belts 36 it allows for slip in the event that the blade 12 becomes trapped or stalled. With this particular arrangement, because pulley and sprocket sizes are so small, one could easily mount the jack shaft on the engine itself (e.g., the engine base or frame) thereby saving additional room and making the tensioning of the V-belts very simple.

Figure 6:
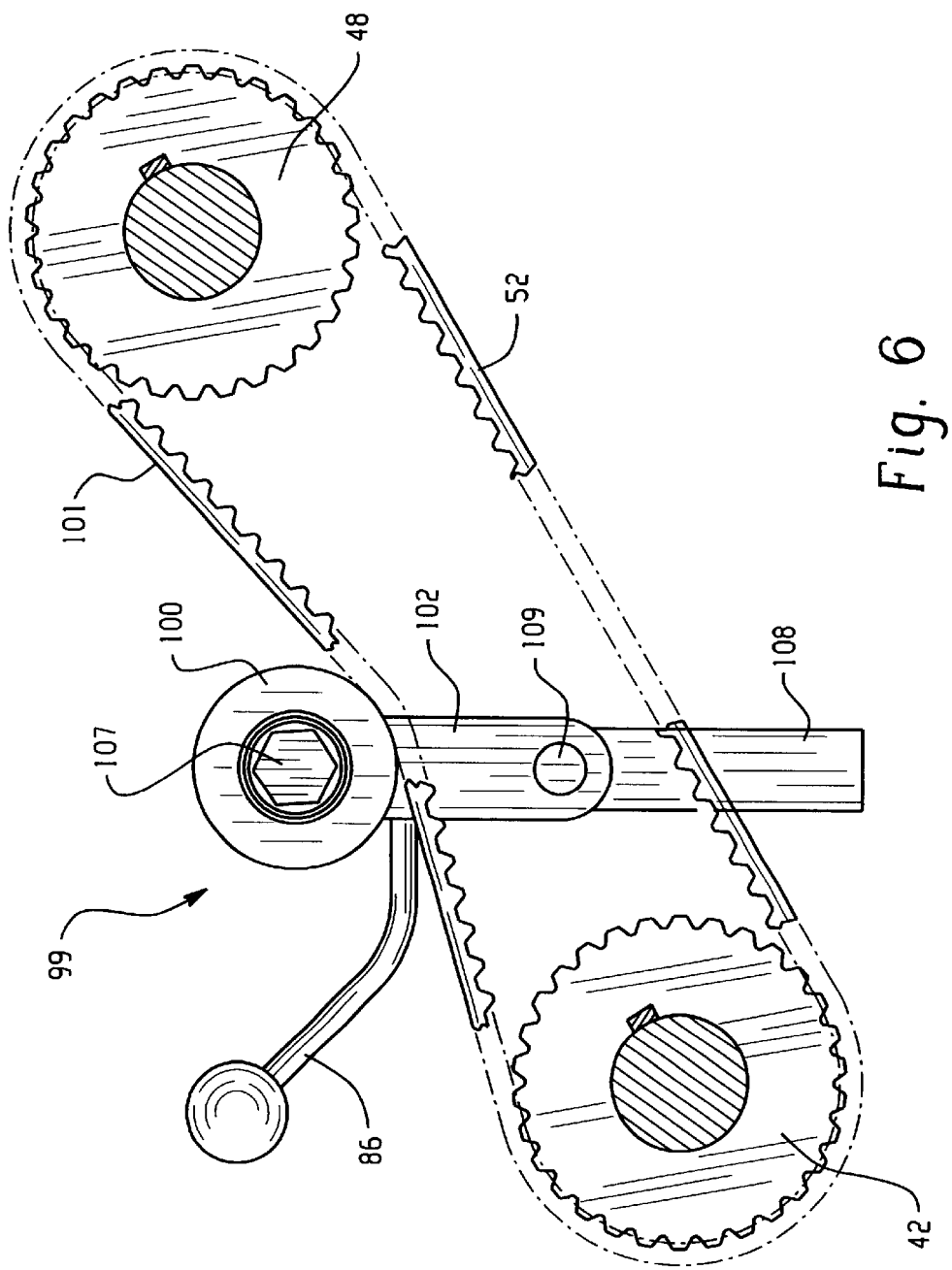
FIG. 6 is a schematic representation of an alternate form of a tensioning device assembly for use in a multispeed drive system made in accordance with the present invention.

Referring now to FIG. 6, there is schematically illustrated another embodiment of a tension assembly made in accordance with the present invention. In FIG. 6, the same numerals have been used to identify elements that are common to FIGS. 1–5. Also, in FIG. 6 only the inner sprockets 42 and 48 are shown for sake of simplicity. In FIG. 6 the tension device assembly 99 includes a handle 86, a smooth surfaced idler roller or sprocket 100 engaging the outer surface 101 of toothed belt 52, an idler arm 102, and an idler block or support 108 mounted to the saw frame 16. Roller 100 rotates freely on screw and bearing assembly 107 that is attached to arm 102. Assembly 99 also includes a bolt 109 that can be loosened with a wrench to allow arm 102 to pivot freely, or tightened to lock arm 102 into position. Upon loosening of bolt 109, a user can swing arm 102 out of engagement with belt 52 thereby allowing a user to change the position of the belt on the sprockets. Using handle 86, a user can then push roller 100 into engagement with belt 52 to apply the desired tension, and then tighten bolt 109 and arm 102 into position. Of course, it will be appreciated that in the embodiments shown in FIGS. 1-6, any one of a variety of means may be employed to hold the idler arm in place. For example, a hydraulic cylinder or spring could be utilized to apply the required force on arm 102 or arm 60.

While the invention has been shown and described with respect to a specific embodiment thereof, this is for the purpose of illustration rather than limitation, and other variations and modifications of the specific device herein shown and described will be apparent to those skilled in the art all within the intended spirit and scope of the invention. Accordingly, the patent is not to be limited in scope and effect to the specific embodiments herein shown and described, nor in any other way that is inconsistent with the extent to which the progress in the art has been advanced by the invention.

What is claimed is:

1. A saw for cutting concrete, asphalt, stone and other hard surfaces comprising:

a frame;

an engine mounted to said frame;

a saw blade for rotational cutting; and a multispeed drive system for transmitting rotational energy from said engine to said saw blade, said multispeed drive system comprising:

an engine drive shaft extending from said engine, said engine drive shaft being provided with a first sprocket assembly comprising at least two sprockets having different diameters;

a jack shaft, said jack shaft being provided with a second sprocket assembly comprising at least two sprockets having different diameters and a first pulley;

a saw blade drive shaft extending from said saw blade, said saw blade drive shaft being provided with a second pulley;

a first flexible belt having teeth formed along an inner surface thereof, said teeth of said first flexible belt engaging one of said sprockets of said first sprocket assembly and one of said sprockets of said second sprocket assembly;

a second flexible belt engaging said first pulley of said jack shaft and said second pulley of said saw blade drive shaft; and a tension device for releasably applying tension to said first flexible belt to ensure proper engagement between said first flexible belt and one of said sprockets of said first sprocket assembly and one of said sprockets of said second sprocket assembly.

2. A saw as set forth in claim 1 wherein said tension device engages said inner surface of said first flexible belt.

3. A saw as set forth in claim 1 wherein said first flexible belt has an outer surface and said tension device engages said outer surface of said first flexible belt.

4. A saw as set forth in claim 3 wherein said outer surface of said first flexible belt is smooth.

5. A saw as set forth in claim 1 wherein upon release of said tension device said first flexible belt may be moved from engagement with one of said sprockets of said first sprocket assembly to another of said sprockets of said first sprocket assembly having a different diameter and/or from engagement with one of said sprockets of said second sprocket assembly to another of said sprockets of said second sprocket assembly having a different diameter to thereby alter the rotational speed of said saw blade.

6. A saw as set forth in claim 5 wherein said tension device further comprises a handle for helping a user increase or decrease the tension on said first flexible belt.

7. A saw as set forth in claim 1 wherein said tension device further comprises an idler sprocket for engaging said inner surface of said first flexible belt.

8. A saw as set forth in claims 4 wherein said tension device further comprises a smooth surfaced roller for engaging said outer surface of said first flexible belt.

9. A saw as set forth in claim 6 wherein said tension device further comprises a pivotal idler arm and a pivotal tension arm that can be pivoted in and out of engagement with said idler arm.

10. A saw as set forth in claim 9 wherein said pivotal tension arm further comprises an adjustable screw for increasing or decreasing the tension applied by said tension device to said first flexible belt.

11. A saw as set forth in claim 10 wherein said tension arm further comprises a toothed idler sprocket for engaging said inner surface of said first flexible belt.

12. A saw for cutting concrete, asphalt, stone and other hard surfaces comprising:

an engine;

a saw blade for rotational cutting; and a drive system for transmitting power from said engine to said saw blade, said drive system comprising:

a jack shaft extending across the width of said saw, said jack shaft being provided with a first multi-sheave pulley and a first sprocket assembly comprising at least two sprockets having different diameters;

a saw blade drive shaft extending from said saw blade, said saw blade drive shaft being provided with a second multi-sheave pulley;

an engine drive shaft extending from said engine, said engine drive shaft being provided with a second sprocket assembly comprising at least two sprockets having different diameters;

a flexible belt having teeth formed along an inner surface thereof, said teeth of said flexible belt engaging one of said sprockets of said first sprocket assembly and one of said sprockets of said second sprocket assembly;

a plurality of V-belts extending between and engaging said first multi-sheave pulley of said jack shaft and said second multi-sheave pulley of said saw blade drive shaft.

13. A saw as set forth in claim 12 wherein said saw is a self-propelled saw.

14. A saw as set forth in claim 12 wherein said drive system comprises a multi-speed drive system.

15. A saw as set forth in claim 14 wherein said drive system further comprises a tension device for releasably applying tension to said flexible belt to ensure proper engagement between said flexible belt and one of said sprockets of said first sprocket assembly and one of said sprockets of said second sprocket assembly.

16. A saw as set forth in claim 15 wherein said second multi-sheave pulley is mounted to an end of said jack shaft proximal to said saw blade and said first sprocket assembly is mounted to a second end of said jack shaft distal from said saw blade.

17. A saw for cutting concrete, asphalt, stone and other hard surfaces comprising an engine, a saw blade for rotation by said engine, and a multispeed drive system for transmitting power from said engine to rotate said saw blade, said multispeed drive system comprising a flexible belt and a tension device for releasably applying tension to said flexible belt, wherein said saw blade rotates at a first speed when said flexible belt is in a first position, engaging a first sprocket assembly and wherein, upon release of said tension device, said flexible belt is movable to a second position engaging a second sprocket assembly in which said saw blade rotates at a second speed that is different than said first speed.

* * * * *